United States Patent
Lohmiller

(10) Patent No.: US 6,574,532 B2
(45) Date of Patent: Jun. 3, 2003

(54) PATH CONTROLLER FOR VEHICLES WHOSE PATH IS INFLUENCED BY CROSS CURRENTS AND A PATH CONTROL SYSTEM AND ASSOCIATED METHODS

(75) Inventor: Winfried Lohmiller, München (DE)

(73) Assignee: Eads Deutschland GmbH (DE)

( * ) Notice: Subject to any disclaimer, the term of this patent is extended or adjusted under 35 U.S.C. 154(b) by 0 days.

(21) Appl. No.: 09/875,780

(22) Filed: Jun. 6, 2001

(65) Prior Publication Data
US 2002/0007231 A1 Jan. 17, 2002

(30) Foreign Application Priority Data
Jun. 6, 2000 (DE) .......................... 100 27 863

(51) Int. Cl.[7] ................. B63H 25/42; B63H 25/04; B64C 13/04
(52) U.S. Cl. .................. 701/3; 701/7; 114/144 R; 244/183
(58) Field of Search ............... 7010/3, 7, 16, 7010/200, 220, 207, 224; 114/144 R, 144 C, 144 RE, 144 B; 244/183, 184, 179, 181

(56) References Cited

U.S. PATENT DOCUMENTS

| | | | | |
|---|---|---|---|---|
| 3,574,262 A | * | 4/1971 | Bowker | 35/12 |
| 3,844,242 A | * | 10/1974 | Sernatinger et al. | 114/144 B |
| 4,040,374 A | * | 8/1977 | Greene | 114/144 C |
| 4,768,153 A | * | 8/1988 | Akamatsu | 364/449 |
| 5,023,796 A | * | 6/1991 | Kahler | 364/434 |
| 5,031,561 A | * | 7/1991 | Nilsson | 114/144 R |
| 5,060,889 A | * | 10/1991 | Nadkarni et al. | 244/183 |

FOREIGN PATENT DOCUMENTS

| | | |
|---|---|---|
| DE | 4110249 | 10/1992 |
| DE | 4336056 | 4/1995 |
| DE | 19625561 | 1/1998 |

* cited by examiner

Primary Examiner—Tan Q. Nguyen
Assistant Examiner—Dalena Tran
(74) Attorney, Agent, or Firm—Ladas & Parry

(57) ABSTRACT

A vehicle path controller for vehicles whose path is influenced by a moving current and has manual or automatic path steering based on a steering signal (v) supplied to a servo device (102) for executing steering movements. Set path data and actual path data relative to an earth based coordinate system are supplied to the path controller (101), the actual path data being supplied by a navigation system (110). The steering signal (v) is derived from a comparison of the set path data with the actual path data and is based on a control function relating steering value (v) and deviation ($\Delta\chi$) of an actual path azimuth angle ($\chi$) from a set path azimuth angle ($\chi_s$). The steering value (v) produces a signal (101b) for a servo device (102). The control function can be represented as a curve relating (v) and ($\Delta\chi$) and which has a negative slope at the point $\Delta\chi=0$ and changes sign at each interval when $\Delta\chi=\pi$ while within each of these intervals its sign remains the same.

12 Claims, 2 Drawing Sheets

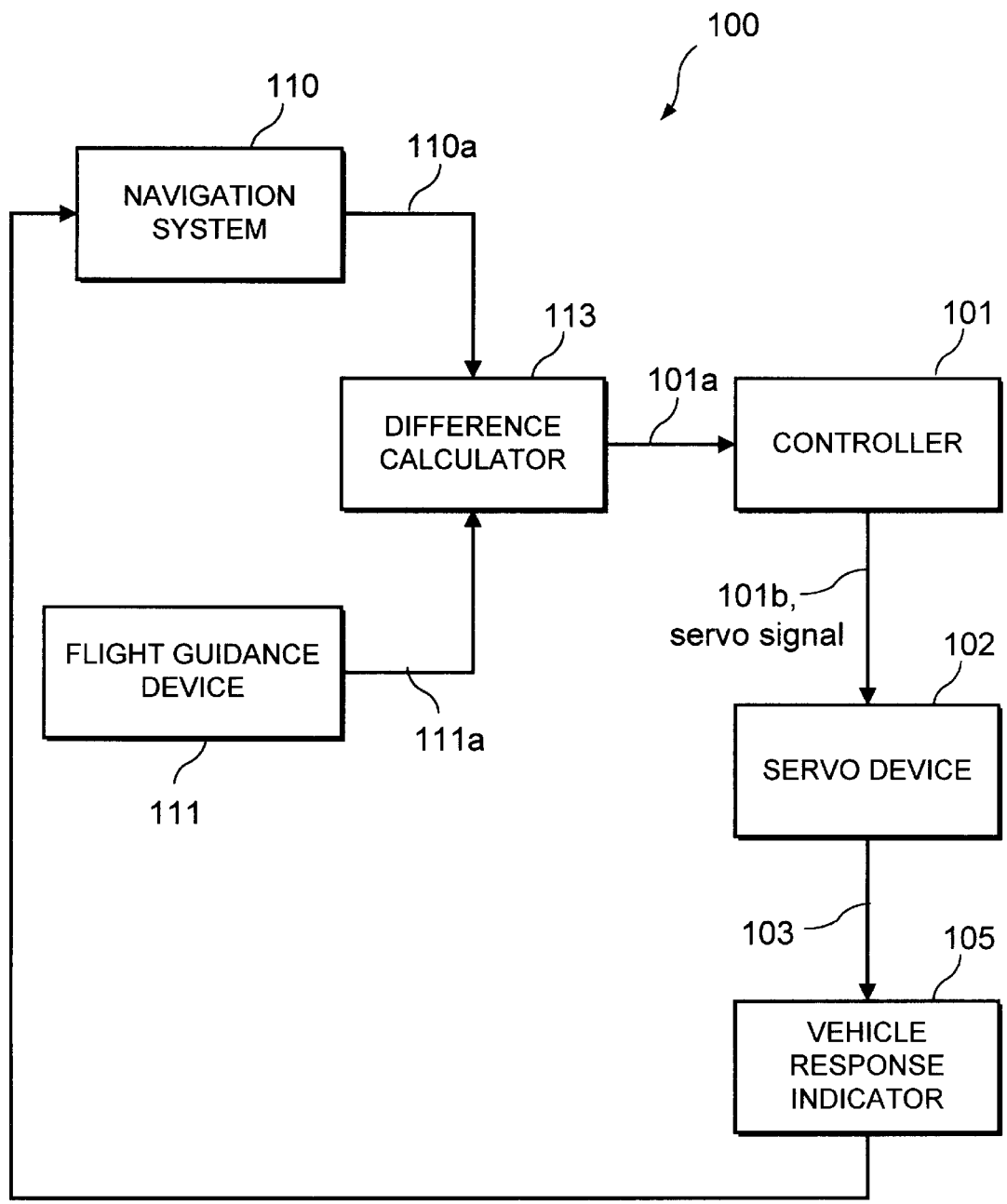
F I G. 1

PATH CONTROLLER FOR VEHICLES WHOSE PATH IS INFLUENCED BY CROSS CURRENTS AND A PATH CONTROL SYSTEM AND ASSOCIATED METHODS

BACKGROUND OF THE INVENTION

The invention relates to a path controller for vehicles whose path is influenced by cross currents in the medium in which the vehicle is traveling. Thus if the vehicle is airborne the travel path is affected by air currents whereas if the vehicle is a water craft it will be influenced by water currents.

The invention also relates to a path control system and a method for performing path control.

The invention is intended in particular for parachutes, balloons, aircraft and ships having manual or automatic steering.

Path controllers are known which are based on measurement of the orientation of the vehicle relative to the moving current influencing its path. The so-called azimuth angle θ relative to the moving current is used for this purpose. The azimuth angle θ represents the angle between the airspeed or velocity vector of the vehicle relative to air in the case of aircraft or relative to water in the case of water craft, and a given reference direction. This leads to a linear controller design. The necessary measurement of the actual azimuth angle θ, however, has disadvantages. It is extremely expensive to perform this measurement with gyroscopic systems, while compass systems are of only limited use when metal-containing cargo is to be transported. Moreover, because the wind conditions are known only imprecisely, the set azimuth angle θ can be determined only imprecisely from the set path azimuth angle $\chi_s$ which is normally given.

German Patent application DE 43 36 056 A1 discloses a flight-control device for steering a parachute using a position-measuring unit comprising a GPS position sensor to calculate position data during flight, a steering unit and a servo unit connected therewith. Before the flight, a set path is introduced into the steering unit by a programming device. During the flight, the GPS positioning sensor continuously delivers the current position data of the parachute to the steering unit, in which these data are compared with the set flight-path data. In the event of a deviation of the actual position from the set position, the servo unit is actuated to bring the parachute back to the set flight path.

German Patent Application DE 196 25 561 A1 discloses a method for course control of waterborne vehicles, wherein position data of the ship are compared with a defined ground course line and from this there is computed deviation of the ship's position relative to the defined ground course line. An autopilot adjusts the actual course of the ship appropriately, thus directing the ship toward and enabling it to reach the defined ground course line, and hold the ship on the defined course line.

German Patent Application DE 41 10 249 A1 regarded as the closest prior art to the present invention, discloses a path controller for ships with a cascade controller which is supplied with the distance of the ship from a set path, the course angle and the course angular velocity of the ship. For this purpose, the position of the ship can be determined by means of a satellite navigation system. In order to compensate for wind perturbations, the instantaneous yaw angle of the ship is minimized by a particular method for determining the gain factor of the course controller.

SUMMARY OF THE INVENTION

An object of the invention is to provide a path controller and path control system for vehicles having manual or automatic steering whose path is influenced by a moving current, as well as to provide a method for calculating a steering variable for such applications, which method is provided with a steering function by which the vehicle can be guided relative to a set path in a manner which is resistant with respect to external influences.

In accordance with the invention, path control is achieved on the basis of the angle difference between the actual path azimuth angle $\chi$ and the set path azimuth angle $\chi_S$ represented as the angle between navigation velocity, i.e. the ground speed vector, and a given reference direction.

In particular, the value of the control signal v for the vehicle is expressed as a curve with respect to the angle difference.

Specifically, the curve of the value of v with respect to $\Delta\chi$ and has a negative slope when $\Delta\chi=0$ and the curve changes sign at each interval when $\Delta\chi=\pi$ while keeping the same sign in each interval.

BRIEF DESCRIPTION OF THE DRAWINGS

FIG. 1 is a diagrammatic illustration of an embodiment of a control system according to the invention.

DETAILED DESCRIPTION

Figure 2:
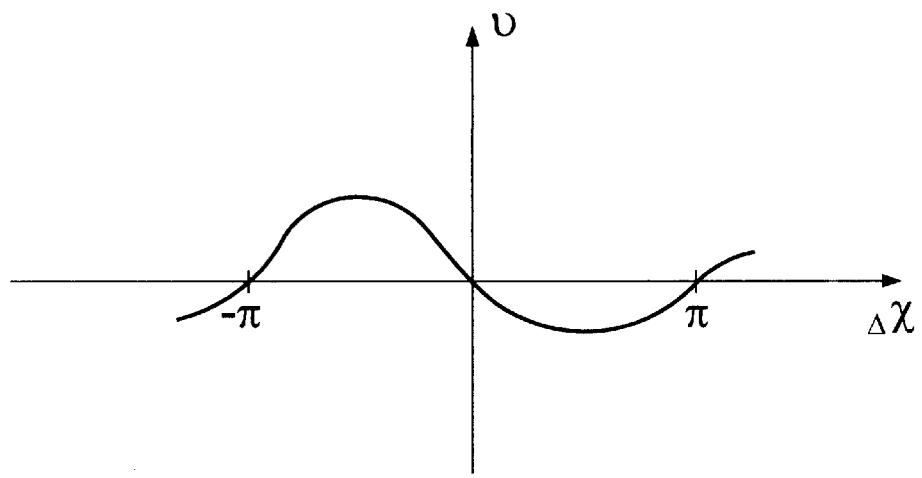
FIG. 2 graphically illustrates the control function of the invention.

Referring to FIG. 1, servo signals 101b, for steering a vehicle on a set ground path, are generated by a control system 100 by means of a controller 101. Controller 101 receives as an input signal 101a the difference $(\chi-\chi_S)=\Delta\chi$ and delivers output signal 101b as the servo signal or steering signal. Servo signal 101b can be transmitted to an actuator device, or a display from which a pilot can effect the steering of the vehicle. The servo signal 101b therefore acts on servo device 102 which produces a well defined response of the vehicle, which in general is affected by the wind. The vehicle response in indicator 105 is measured by a navigation system 110 which produces output signal 110a. The navigation system 110 preferably comprises a satellite navigation receiver which provides the actual path azimuth $\chi$ with respect to an earth fixed coordinate system with relatively little complexity as output signal 110a. The control system 100 comprises in addition to the controller 101 and the navigation system 110, a flight-guidance device 111, which delivers an output signal 111a, which contains the set path azimuth $\chi_S$. A difference calculator 113 forms the difference $(\chi-\chi_S)=\Delta\chi$ of the actual path azimuth $\chi$ and the set path azimuth $\chi_s$.

Flight-guidance device 111 calculates the set ground path, preferably in the form of discrete path points or in the form of at least one target point or in the form of a quasi-continuous curved path. The set path can be generated either before or during the flight. Furthermore, the set path can be generated in a device outside the vehicle, for example, in another vehicle or in a ground station, and transmitted, for example, by radio signals to control system 100 before or during the flight. On the basis of this set ground path, flight-guidance device 111 determines the instantaneous set path azimuth angle $\chi_S$ which is defined as the angle between the tangent to the set ground path and a given reference direction. The set path azimuth angle $\chi_S$ can depend on instantaneous position and time.

The navigation system 110, such as a satellite navigation system, delivers the actual path azimuth angle $\chi$ at the same time.

The servo device 102 can even be the pilot who himself operates steering lines. As known in the art, instrument integration of the functions can be accomplished in a single instrument or in different modules.

According to the invention, a first part of a steering variable v, which in FIG. 1 is denoted by reference numeral 101*b*, is determined in controller 101 as a function f of the deviation $\Delta\chi$ of the actual path azimuth angle $\chi$ from the set path azimuth angle $\chi_S$ in difference calculator 113. The function f for calculation of steering variable v is defined as follows:

f has a negative slope at point $\Delta\chi=0$; and starting from the origin between positive and negative values of $\Delta\chi$, f changes sign after each interval of length $\pi$, while within these intervals its sign remains constant.

In mathematical notation, these inventive functions can also be defined as follows;

$f(\Delta\chi)=0$ for $\Delta\chi=0 \ldots, -\pi, 0, \pi, \ldots$ $f(\Delta\chi)<0$ for $\ldots, -2\pi<\Delta\chi<-\pi, 0<\Delta\chi<\pi, 2\pi<\Delta\chi<3\pi, \ldots$ $f(\Delta\chi)>0$ for $, -\pi<\Delta\chi<0, \pi<\Delta\chi<2\pi, 3\pi<\Delta\chi<4\pi, \ldots$ A simple example of $f(\Delta\chi)$ is the sine function $f(\Delta\chi)=k \sin(\Delta\chi)$, wherein $k<0$. An embodiment is also conceivable in which the range of values $\Delta\chi$ is limited to an angle of $2\pi$.

An example for the curve of the inventive control function $f(\Delta\chi)$ is illustrated in FIG. 2. The curve $f(\Delta\chi)$ is denoted by reference numeral 10.

The inventive steering variable v can also comprise a further part, which expands it by a summand such as a damping term. At least one of the members thereof is a function $v(\Delta\chi)$ with the foregoing properties. Further functions or systems can also be connected to the inventive control function.

The invention control function does not have to be related to a deviation $\Delta\chi$ but instead the steering variable v can be formed in general by means of a control function $f(\chi,\chi_S)$, which on the basis of the deviation of the actual path azimuth angle $\chi$ from the set path azimuth angle $\chi_S$ generates a manipulated variable for servo device 102 and which has a negative slope at the point $\chi=\chi_S$ where it has the value zero and which, starting from $\chi_S$ changes sign after each interval of angle $\pi$, while within these intervals its sign remains constant. For the general case, difference calculator 113 in FIG. 1 is not necessary, but instead the actual path azimuth angle $\chi$ and the set path azimuth angle $\chi_S$ can be fed directly to controller 101.

Figure 3:
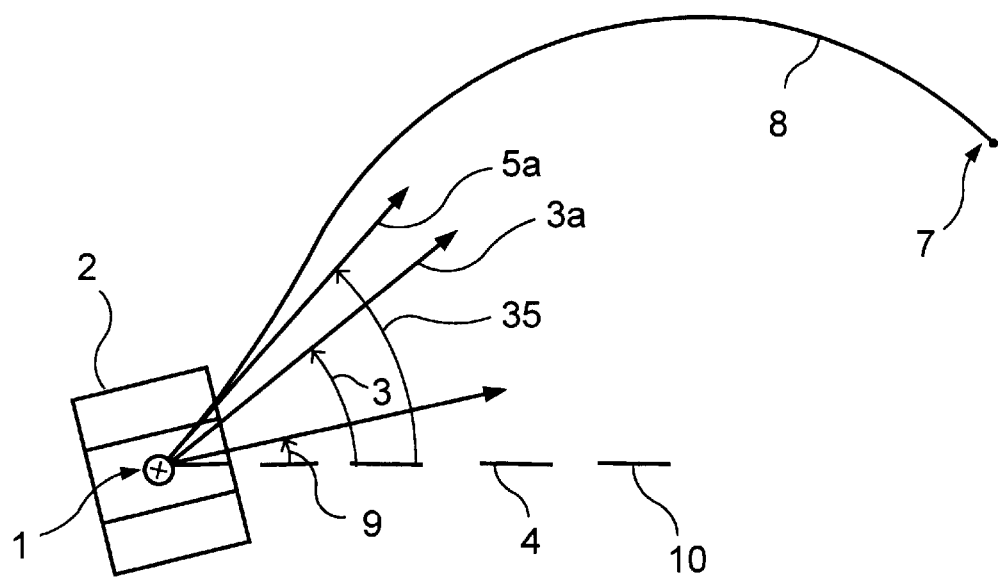
FIG. 3 diagrammatical illustrates the angles, directions and velocities relevant for control of a balloon.

To illustrate the terminology used, FIG. 3 shows the current or actual position 1 of a balloon 2 as an example of a vehicle, which position can be determined, for example, according to latitude and longitude of the location of the earth's surface, by means of navigation system 110. In FIG. 3 there is also shown the actual path azimuth angle, which is denoted by reference numeral 3, and which is the angle between a reference line 4, such as the equator, and the path azimuth vector 3*a*. According to the invention, the actual path azimuth angle 3 is also determined by navigation system 110 and preferably by means of satellite navigation.

The set path azimuth angle, which is computed by control means 100 and which is denoted by reference numeral 5 in FIG. 3, is preferably defined as the angle between the line extending between current position 1 and the respective target point denoted by reference numeral 7, and reference line 4. It can also be the angle between a set path azimuth direction 5*a* and reference line 4 as shown in FIG. 3. The target point can also be one of many discrete points on the set path. In this case, a change will be made to the next target point and thus to a new set path azimuth angle $\chi_S$ when the aircraft or the balloon 2 has reached a given distance from the previously designated target point 7. The set path azimuth angle $\chi_S$ can also be calculated from a locus of a set-path trajectory 8. For comparison, the path azimuth angle $\theta$ is also indicated in FIG. 3, where it is denoted by reference numeral 9.

The principle of operation of the invention will be described hereafter.

Steering variable v is the manipulated variable for steering the vehicle. In the case of a parachute, for example, steering variable v can be the length by which a steering line is to be pulled. From the characteristics of a specific parachute there is created a predetermined reaction of the parachute, such as a predetermined turning rate, in response to a given pulling length. Instead of pulling length, the steering input or the servo travel of a servo motor can also be the determining factor, if steering takes place mechanically or automatically. Depending on how the vehicle steering system or control system is functionally configured, the manipulated variable can be formed, for example, by the deflection of the respective control surface or control surfaces or by an input or output variable of the servo motor.

The response of the vehicle can be defined by a simple model of azimuth dynamics. In the case of the parachute, the cable input u of the parachute is related to the azimuth angle e of the parachute and to the steering efficiency $g>0$ as follows:

$$\dot{\Theta} = g \cdot u$$

Furthermore, because of the motor dynamics or the human response, the cable input u reacts with a delay to the input v, and therefore $$\dot{u} = -d \cdot u + v$$

where the variable v represents a delay term.

Thus the following overall dynamic response is obtained:

$$\ddot{\Theta} = -d \cdot g \cdot \dot{\Theta} + g \cdot v$$

The inventive control function generally leads to one stable and one unstable equilibrium point. Thereby the vehicle will always leave the unstable equilibrium point and stabilize at the stable equilibrium point, which corresponds to the desired flight status with set flight direction $\chi-\chi_S = \ldots, -2\pi, 0, 2\pi$. Thus the waypoints or target points will be flown to individually and in a manner that is resistant with respect to wind perturbations.

At high flight velocities, the unstable equilibrium point corresponds to the case in which the parachute has the correct flight direction $\chi_S$ but is oriented opposite the flight direction. If the case occurs that the flight direction $\chi_S$ cannot be reached because the opposing wind is too strong, the parachute begins to rotate. This can be detected by the fact that the flight direction $\chi_S$ is not reached after a convergence time typical of the airborne craft. In this case a new target point and thus a new flight direction $\chi_S$ must be determined.

At low flight velocities the unstable equilibrium point corresponds to flight in a set path azimuth $\chi_S$ rotated by 180°.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A path controller for a parachute whose path is affected by wind currents and controlled by signals from a servo device, said path controller comprising a control device receiving as input signals an actual path azimuth angle ($\chi$) and a set path azimuth angle ($\chi_s$) and producing a steering control signal (v) for said servo device, said control device being provided with a control function which is based on deviation ($\Delta\chi$) of the actual path azimuth angle from the set path azimuth angle to produce said steering control signal (v), said control function being a sine curve representing a value of the steering control signal (v) with respect to $\Delta\chi$ wherein when $\Delta\chi=0$, said curve has a negative slope, said curve changing sign when going from $-\Delta\chi$ to $+\Delta\chi$ and after each interval when $\Delta\chi=\pi$, said curve in said intervals having the same sign.

2. The path controller of claim 1, wherein said set path is defined by a plurality of target points which are selected sequentially for determining the steering control signal v.

3. The path controller of claim 1, wherein the actual path azimuth angle is determined by a navigation system with reference to an earth-fixed coordinate system.

4. The path controller of claim 3, wherein a comparator is connected to the control device to provide thereto difference values $\Delta\chi$ of the actual and set path azimuth angles.

5. A path control system for a parachute whose path is affected by wind currents, said system comprising a flight guidance device providing a set path azimuth angle ($\chi_s$) of the parachute, a path controller receiving the set path azimuth angle and an actual path azimuth angle ($\chi$) to produce a steering signal (v) based thereon, and a servo device receiving the steering signal from the path controller for producing output signals for operating the vehicle to correct any deviation between the actual and set path azimuth angles, said path controller having a control function defined by a sine curve representing a value of the steering signal v as a function of a difference ($\Delta\chi$) between $\chi$ and $\chi_s$, wherein when $\Delta\chi=0$, said curve has a negative slope, said curve changing sign when going from $-\Delta\chi$ to $+\Delta\chi$ and after each interval when $\Delta\chi=\pi$, said curve in said intervals having the same sign.

6. The path control system of claim 5, wherein said set path is defined by a plurality of target points which are selected sequentially for determining the steering control signal v.

7. The path controller of claim 5, wherein said actual path azimuth angle is determined by a navigation system with reference to an earth-fixed coordinate system.

8. The path control system of claim 7, comprising a comparator having inputs connected to said navigation system and to said flight guidance system to produce an output connected to said path controller.

9. A method for controlling the path of a parachute which is affected by wind currents, said method comprising:
   determining a set path azimuth angle ($\chi_s$) of the vehicle at a point along said path,
   determining an actual path azimuth angle ($\chi$) of the vehicle at said point, and
   producing a steering signal (v) based on the determined values ($\chi$) and ($\chi_s$), to enable control of the vehicle to eliminate any difference between ($\chi$) and ($\chi_s$), wherein said steering signal (v) is expressed as a sine curve with respect to the difference ($\Delta\chi$) between $\chi$ and $\chi_s$ representing deviation of the actual path azimuth angle and the set path azimuth angle, said sine curve having a value of zero when $\chi=\chi_s$ and having a negative slope at $\Delta\chi=0$ and changing sign when going from $-\Delta\chi$ to $+\Delta\chi$.and after each interval when $\Delta\chi=\pi$, said curve having the same sign in each said interval.

10. The method of claim 9, wherein said set path azimuth angle is defined by a plurality of target points which are selected sequentially for determining the steering control signals v of the set path azimuth angles.

11. The method of claim 9, wherein the actual path azimuth angle is determined by a navigation system with reference to an earth based coordinate system.

12. The method of claim 9, comprising forming said set path azimuth angle by a plurality of target points which are selected successively for determining the actual and set path azimuth angles.

* * * * *